United States Patent [19]

Smith

[11] Patent Number: 4,928,631
[45] Date of Patent: May 29, 1990

[54] BLUEBIRD HOUSE

[76] Inventor: Cliff A. Smith, 5617 Kenilworth Cir., Shreveport, La. 71129

[21] Appl. No.: 310,213

[22] Filed: Feb. 13, 1989

[51] Int. Cl.⁵ .............................................. A01K 31/14
[52] U.S. Cl. .................................................... 119/23
[58] Field of Search ........................................... 119/23

[56] References Cited

U.S. PATENT DOCUMENTS

| D. 269,468 | 6/1983 | Babcock et al. | 119/23 |
| 1,158,968 | 2/1915 | Benedict | 119/23 |
| 2,077,208 | 4/1937 | Brady | 119/23 |
| 3,053,226 | 9/1962 | Dunn | 119/23 |
| 3,244,148 | 4/1966 | Long | 119/23 |
| 3,426,732 | 2/1969 | Wade | 119/23 |
| 3,478,722 | 11/1969 | Falcone et al. | 119/23 |
| 3,496,913 | 2/1970 | Vail | 119/23 |
| 3,774,576 | 11/1973 | Moore | 119/23 |
| 4,442,793 | 4/1984 | Overpeck et al. | 119/23 |
| 4,506,629 | 3/1985 | Cross | 119/23 |

FOREIGN PATENT DOCUMENTS 117116 3/1926 Switzerland ........................ 119/23
516266 12/1939 United Kingdom .................. 119/23

Primary Examiner—Paul J. Hirsch

[57] ABSTRACT

This disclosure is concerned with a bluebird house and includes features not only for the bluebird, but also for an observer who might wish to monitor the nesting processing of the bird from beginning to end. The invention includes a viewing window in one of the sidewalls of the house having a hinged shutter which may be opened momentarily to view the nesting operations but also closable to insure the bird's privacy. The house also includes an extended entry-way to prevent most preditors from reaching the nest and a means for helping the newly hatched fledglings to reach the entry-way for their initial flight to freedom. Means are also provided for the quick inspection and cleaning of the nest by removing a portion of one of the sidewalls of the structure without disturbing the nest itself.

1 Claim, 2 Drawing Sheets

BLUEBIRD HOUSE

The present invention relates to birdhouses generally, but more in particular to a bluebird house.

BRIEF BACKGROUND OF THE INVENTION

According to 1985 U.S. Fish and Wildlife Service statistics, more than one-third of the nation's adult population participates in bird feeding alone, spending more than $500 million annually with many, many more spending time and money on the pleasant habit of simply watching. There is a great concern today about ecology and the preservation of many species of our wildlife, particularly the songbirds. One of these songbirds is the bluebird popular in both prose and poetry. It is a bird that is not as shy as many other birds. It nests fairly close to the ground—a characteristic which is taken advantage of by the present invention. It will not abandon its nest, even though it has been tampered with by an outsider. When the nest is completed and the eggs are laid, there is an incubation period about 14 days after the last egg has been laid. All of this remarkable process can be monitored by both child and adult alike for their enjoyment and education as well as protecting the future of the bluebird.

It is an object, therefore, of the present invention to provide a birdhouse for the nesting of the birds, but also which includes a window for monitoring such nesting.

Another object of the invention is the provision of a house for bluebirds purposely made of rough sawn, weather-resistant and unfinished wood which will enhance the decor of any lawn or garden.

Another object of the invention is a provision of a hinged shutter over the monitoring window to permit momentary viewing and yet closable to insure the privacy of the bird family.

A further object of the invention is the provision of a birdhouse which includes an extended entry-way to prevent unwanted predators from being able to reach the nest proper.

A still further object of the invention is the provision of a ladder extending from the nest to the entry-way to assist the newly hatched birds in reaching their launch pad for their initial flight.

Other objects and advantages of the invention will become apparent in the course of the following detailed description when viewed together with the accompanying drawing in which.

Figure 2:
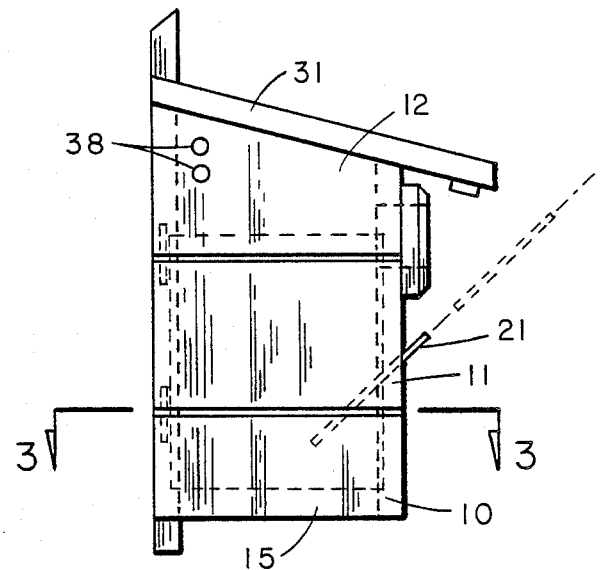
FIG. 2 is a left side elevational view of the invention.
Figure 3:
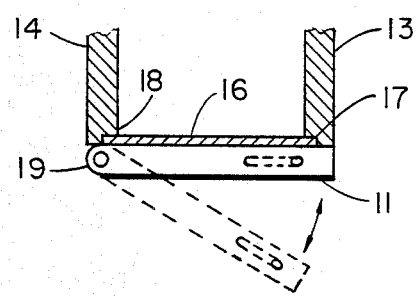
FIG. 3 is a cross sectional view taken along the lines 3—3 of FIG. 2 with parts broken away to show the manner of opening and closing of the shutter over the viewing window.

FIG. 2 of the drawing shows the left side of the house which is composed of three pieces—a lower piece 10, a center piece 11 which hereinafter will be called the shutter, and an upper piece 12. Both of the pieces 10 and 12 are either glued or nailed to the front and back walls 13 and 14, and to the floor 15. A rectangular piece of glass 16 is mounted in recesses 17 and 18 in the edge faces of the front and back walls as shown in FIG. 3, the depth of the inset being such as to permit the outside face of the glass to lie flush with the edges of the walls 13 and 14 and glued thereto. The shutter 11 is the same thickness as the walls, hence the finished face of the left side of the house lies in a true plane.

Figure 1:
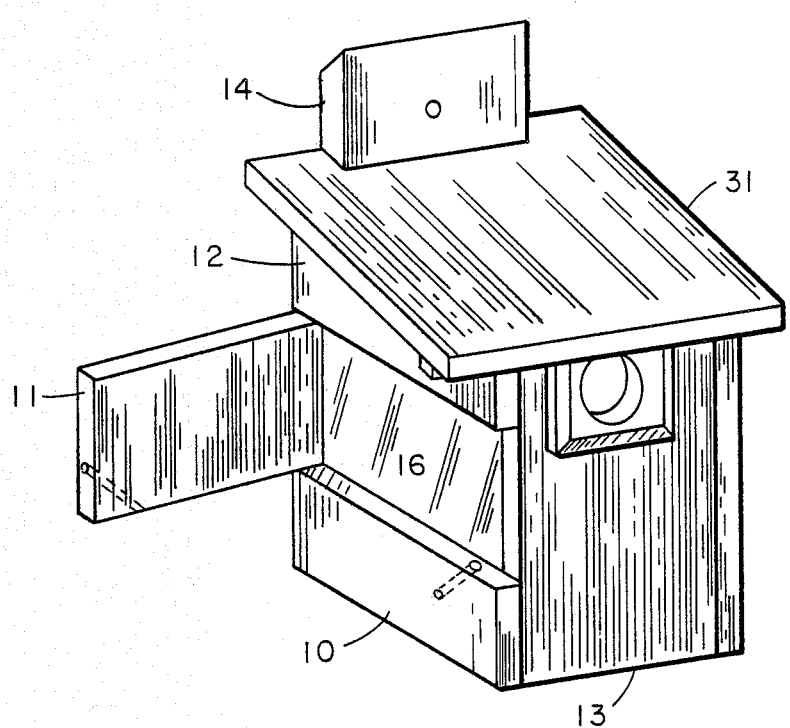
FIG. 1 is a perspective view of the invention showing the window shutter in the open position to permit viewing inside the birdhouse.
Figure 5:
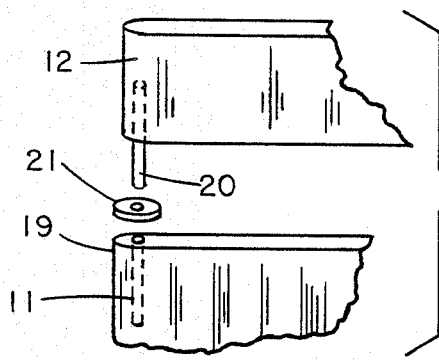
FIG. 5 is an exploded view given to show the hinge arrangement of FIG. 3 more in detail.
Figure 6:
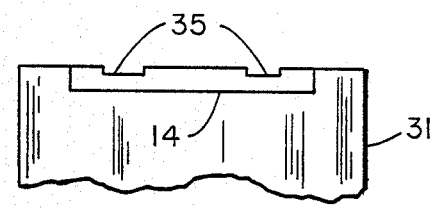
FIG. 6 is a partially broken top view.

As noted in FIGS. 1 and 3, the shutter 11 is hinged to the upper piece of the wall 12 and also the lower piece by a hinge arrangement as shown in FIGS. 3 and 5. While these figures illustrate the construction and action of the upper hinge only the bottom hinge is of the same construction. The back edges 19 of the shutter 11 are rounded to permit said shutter to be opened and closed without interfering with the back wall 14. Both top and bottom pieces 10 and 12, together with the shutter 11, are pre-drilled during manufacture to a given depth for a hinge pin 20 preferably of a hard, plastic material and of a diameter slightly less than the diameter of the drilled holes. The pins are inserted into the holes during the assembly of the left wall and are thus hidden from view. Such construction precludes the use of a metal hinge which would be subject to rust and decay from the weather. It will be noted that each hinge is provided with a thin plastic washer 21 to provide clearance for the shutter and to keep it from binding when being opened and closed.

Reference is again made to FIGS. 2 and 3 which illustrate the locking means for the shutter. Instead of a metal hasp or the like which would be subject to rusting, applicant has chosen to drill a hole, as illustrated in FIG. 2, at approximately a 45 degree angle through the lower edge of the shutter 11 and continuing as a blind hole into the bottom portion 10 of the left sidewall. Thus, with the holes in perfect alignment, a plastic door pin 21 can be inserted into the aforementioned aligned holes to lock the shutter against opening. To open the shutter 11, the pin 21 may be removed and the shutter opened as illustrated in FIGS. 1 and 3.

Figure 7:
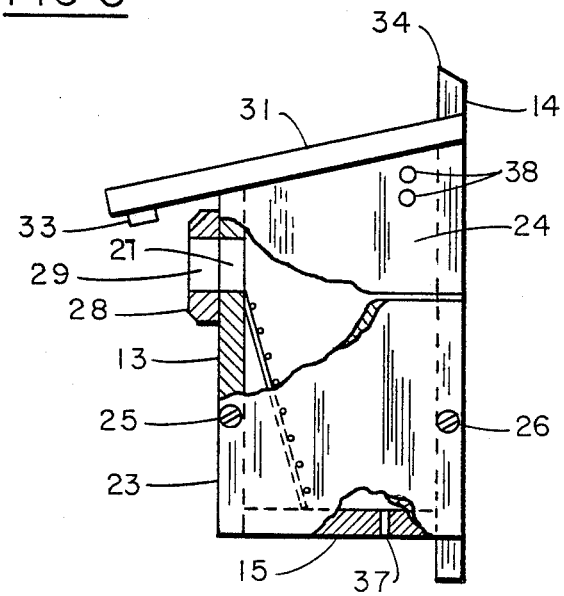
FIG. 7 is a side elevational view with parts broken away to better show the extended entry-way and the ladder leading from the nest thereto.

FIG. 7 is elevational view of the right sidewall of the house with portions broken away to more clearly illustrate the invention. This right sidewall is composed of two sections, a lower section 23 and an upper section 24, the lower section extending upwardly to a point slightly over one-half the total height of the house. Instead of being permanently affixed to the front wall 13, the back wall 14, and floor 15, this section 23 is held in place on the house by means of two fast-acting screws 25 and 26. The upper section 24 is, of course, permanently in place. Now it can be seen that if there is danger to the nest such as by bees, wasps or the like, the entire section 23 may be quickly removed by loosening the two screws 25 and 26 and the danger alleviated. It will be noted that this operation may be done without even touching the nest itself. This procedure is also highly advantageous when cleaning the nest.

FIG. 7 illustrates the aforementioned entry-way as having a front piece 28 provided with a hole 29 adapted for concentric alignment with the hole 27 in the front wall 13. Thus the entry-way is elongated to a point beyond the reach of a cat or squirrel which might endanger or destroy the nest.

Figure 4:
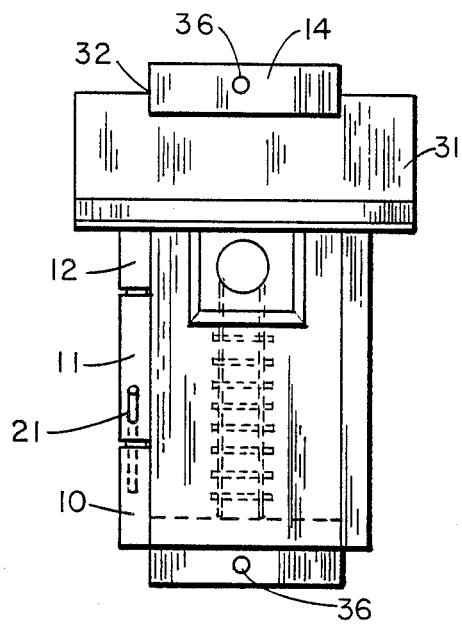
FIG. 4 is a front view.

FIG. 7 also shows the climbing ladder 30 shown also in FIG. 4 by the dotted lines. While the ladder in this instance, is of a wire form with ladder rungs attached to two uprights, the ladder may be made of wood or may even be stamped or machined into the back side of the front wall. It is noted that the two upper ends of the ladder rails are bent over the rim of the entry-way to prevent the ladder from slipping. The roof 31 is provided with an inset 32 to receive the upper end of the back side wall 14. The roof is angled downwardly as shown in FIGS. 2 and 7. The roof also overhangs the front wall 13 and is provided with a reinforcing strip 33 positioned under the front extremity thereof. This prevents warpage of the roof since it is the widest construction member of the house. The back wall 14 is beveled along its upper extremity 34 and is provided with water sluices 35 which divert water, at least partially, away from the roof and toward the ground. Mounting holes 36 are shown extending through the back wall whereby the house may be affixed to a post or any other standard. Drain holes 37 are provided in the floor 15 as illustrated by FIG. 7. These holes have no particular location on the floor but may be spotted at random therethrough. This same FIG. illustrates vent holes 38 positioned at the upper end of the top section 24 of the right sidewall section and at the upper piece 12 of the left sidewall.

It is to be remembered that the house is simple in its construction and can be manufactured and sold to the public at reasonable cost. The construction material is from rough sawn lumber of a weather resistant type. It does not require painting or any other finish; not does it require a perch for bluebirds do not use a perch but prefer using a nearby clothesline, a bush, a television antenna or the like just before entering the nest. In short, they fly and light directly to the outer end of the entry-way.

The house is preferrably mounted to a supporting standard at a point some 5 to 7 feet above ground so that the viewing window may be used by child and adult alike.

I claim:

1. In a house for the nesting of birds having, in combination, a box-like structure consisting of left and right sidewalls, a back wall, a front wall, a roof and a floor; an entry-way in said front wall for the ingress and egress of said birds, a transparent window affixed to said front and back walls, said left wall consisting of three sections, one of which is hinged to said back wall and serving as a shutter for said window, said hinged section being of an area equal to, or less than, one third of the area of the entire area of said left wall, said right wall constituting an upper and a lower section, said lower section being removably affixed to the edge portions of said front and back walls to provide emergency access to the nesting area within said box-like structure, and wherein said back wall is provided with vertically disposed channels thereon to assist in diverting rain water away from said house and means for mounting said house to a tree or the like.

* * * * *